United States Patent
Tinnerman

[15] 3,645,311
[45] Feb. 29, 1972

[54] CONSTANT TORQUE THREADED FASTENER FORMATION

[72] Inventor: George A. Tinnerman, 3600 Stewart Ave., Miami, Fla. 33133

[22] Filed: Nov. 3, 1969

[21] Appl. No.: 873,163

Related U.S. Application Data

[60] Continuation-in-part of Ser. No. 728,988, May 14, 1968, Pat. No. 3,476,163, which is a division of Ser. No. 489,467, Sept. 20, 1965, Pat. No. 3,382,753.

[52] U.S. Cl.............................................151/41.75, 151/14
[51] Int. Cl.........................................................F16b 39/30
[58] Field of Search..................85/36, 32 V; 151/41.75, 22, 151/14, 30, 14 CS

[56] References Cited

UNITED STATES PATENTS

| | | | |
|---|---|---|---|
| 1,957,095 | 5/1934 | Cole | 151/14 CS |
| 2,170,739 | 8/1939 | Tinnerman | 151/41.75 |
| 2,515,220 | 7/1950 | Hattan | 151/14 CS |
| 2,356,486 | 8/1944 | Tinnerman | 151/14 |
| 2,177,044 | 10/1939 | Purtell | 151/22 |
| 2,233,230 | 2/1941 | Tinnerman | 151/41.75 |
| 2,341,829 | 2/1944 | Tinnerman | 151/41.75 |
| 3,207,022 | 9/1965 | Tinnerman | 85/36 |
| 2,539,172 | 1/1951 | Andrews | 151/41.75 |

FOREIGN PATENTS OR APPLICATIONS

| | | | |
|---|---|---|---|
| 1,368,920 | 6/1964 | France | 151/30 |

Primary Examiner—Edward C. Allen
Attorney—Revere B. Gurley

[57] ABSTRACT

A sheet metal nut formation is provided with helical edges engaging a threaded shank. One of these helical edges has a portion deflected out of the helical curve to engage the sides of the threads of the threaded shank and provides constant torque resistance to rotation of the threaded shank.

The constant torque nut formation is used in a fastener to receive an adjustment screw, guides on the fastener maintaining the shank in engagement with the nut formation.

A U-shaped clip-type fastener uses the constant torque nut formation on one arm in cooperation with a positive stop boss on the other arm so that the arms may be clamped together against the positive stop, the constant torque formation preventing loosening of one threaded shank and the boss guiding the shank to maintain engagement with the nut formation.

1 Claims, 8 Drawing Figures

PATENTED FEB 29 1972 3,645,311
SHEET 1 OF 2
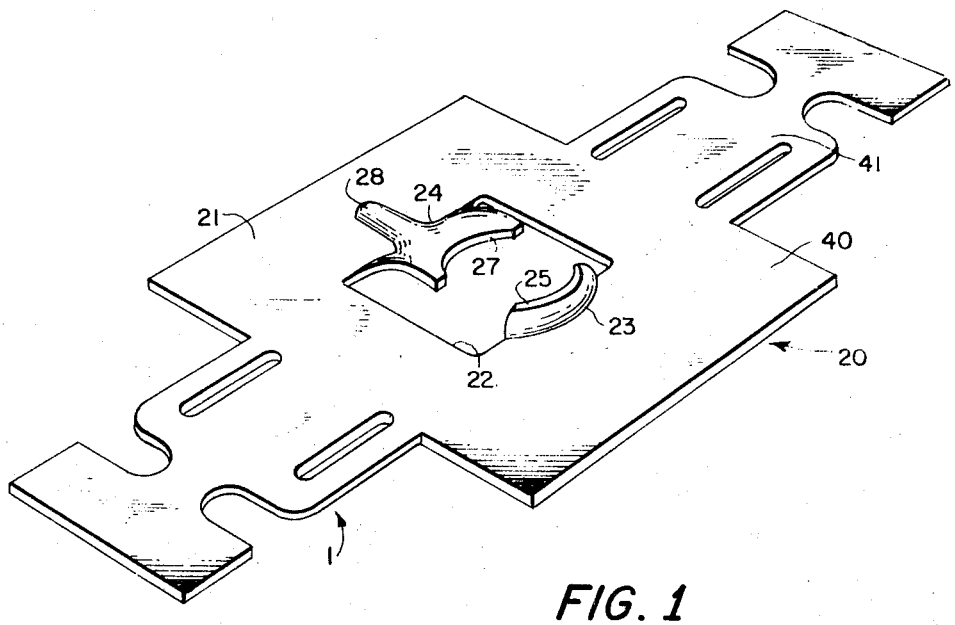
FIG. 1
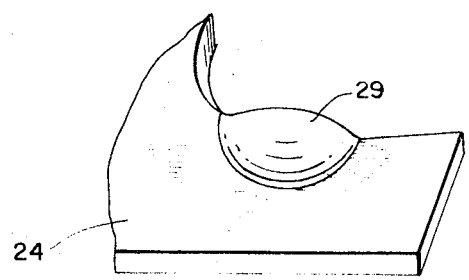
FIG. 2
FIG. 3
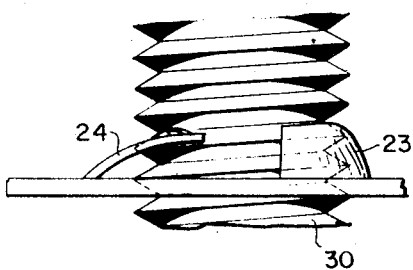
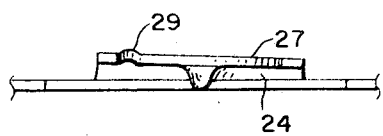
FIG. 4
INVENTOR
GEORGE A. TINNERMAN
BY Reuen B Gurley
ATTORNEY

PATENTED FEB 29 1972 3,645,311

INVENTOR
GEORGE A. TINNERMAN

BY *Revere B. Gurley*

ATTORNEY

CONSTANT TORQUE THREADED FASTENER FORMATION

This application is a continuation-in-part of Ser. No. 728,988, filed May 14, 1968, U.S. Pat. No. 3,476,163 issued Nov. 4, 1969, which is a division of Ser. No. 489,467, filed Sept. 20, 1965 now U.S. Pat. No. 3,382,753.

NATURE AND OBJECTS OF INVENTION

This invention relates to a sheet metal nut formation and to types of fasteners which embody the novel formation in cooperation with other elements.

The invention resides primarily in a sheet metal nut formation which provides constant torque resistance when in engagement with a threaded shank, so that it exerts substantial resistance to rotation and loosening of the fastener. Two types of fasteners are included in which the constant torque feature has especial utility when combined with other features. In one of these types, the nut is attached to a panel or base member with a guide for the shank, which is threaded in from the front side and is not associated with an additional lock nut. In the other form, the constant torque engaging portion is drawn up against a stop, the constant torque feature preventing loosening of the threaded shank without excessive tightening.

THE DRAWINGS

FIG. 1 is a sheet metal stamping for one type of fastener with the thread engaging nut formation.

FIG. 2 is a fragmentary elevation of the nut formation in engagement with a threaded shank.

FIG. 3 is a fragmentary view of the tongue of the nut formation embodying the invention in its broadest aspects.

FIG. 4 is an elevation of the end of the tongue of the nut formation.

DETAILED DESCRIPTION OF THE DRAWINGS

Figure 5:
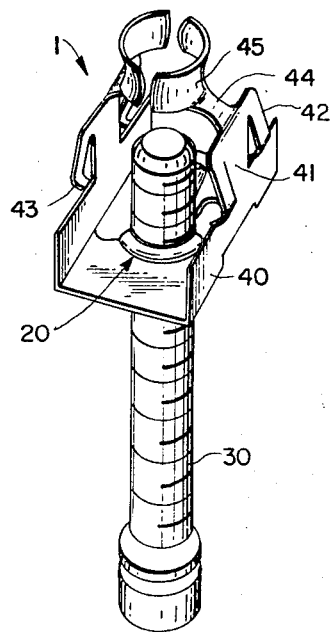
FIG. 5 is a perspective view of the completed fastener of FIG. 1, in engagement with a threaded shank.

The fastener 1 embodies a nut formation indicated at 20, which is a special feature of this invention. This nut formation consists of an apertured sheet metal base portion 21, the aperture 22 having thread engaging elements about its periphery at 23, 24.

These elements may take several different shapes, as shown in FIG. 1, in which element 23 is an upstanding segmental collar with a helical edge 25 at its end spaced from the base portion 21. The element opposite collar 23 is a tongue 24 struck out from the base portion 21, with a helical edge 27 corresponding to edge 25. This tongue is cut from the base portion along its sides, with its free end spaced from the back portion to provide resiliency. A rib 28 stamped in the tongue and adjoining base portion stiffens the tongue to resist excessive bending.

The resilient tongue 24 is so shaped between the ends 26 of its helical edge as to produce torque resistance to rotation of a threaded shank 30 in engagement with the tongue. For this purpose, the helical edge 27 is deformed or deflected out of the helical curve, as at 29, to engage the threads of the shank. This deflected portion 29 frictionally engages the side of the thread in the shank, the V-shaped walls confining the deflected portion of the tongue to provide constant resistance to rotation of the shank. Since the threads are always accurately cut, it is possible to secure uniform frictional engagement of the edge of the tongue with the shank.

Figure 6:
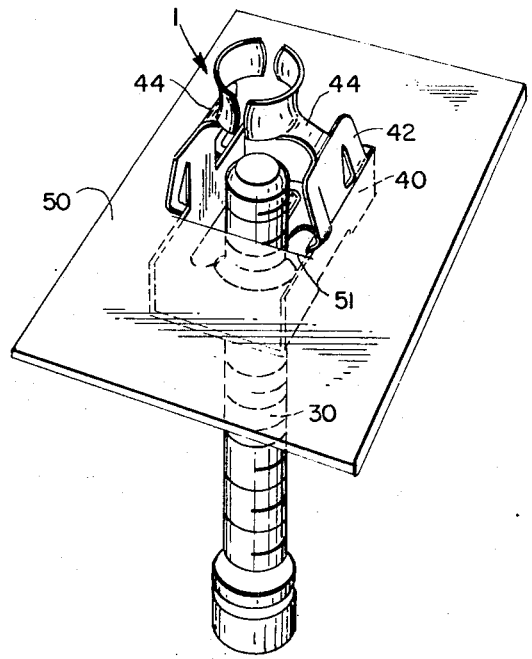
FIG. 6 is a perspective of the fastener of FIG. 4, showing it mounted on a plate or base member.

The fastener of FIGS. 5 and 6 is constructed for cooperation with a shank 30 used as an adjustment element. The screw shown here may control the adjustment of automobile headlights, where lock nuts are impractical and the shank must be capable of maintaining its adjustment when subject to frequent vibrations.

FIG. 1 shows a blank from which the fastener of FIGS. 5 and 6 is formed. The flat body of FIG. 1 has a square base and outwardly projecting wings, which are bent to form the upstanding flanges 40 along the opposite edges, with an arm 41 extending from each flange. Along the sides of each arm 41, tongues 42 are slit and bent outwardly with a short, inwardly bent tab 43 on the end of each tongue.

The upstanding flanges 40 abut the surface of plate or mounting member 50, while the tongues snap through the aperture 51 and retain the fastener in place, as shown in FIG. 5. The arms 41 are extended and bent toward each other as at 44 and carry curved guide elements 45 on their ends, these guide elements substantially encircling and guiding the shank 30.

When used to receive headlight adjustment screws, the fastener is snapped into aperture 51 in the frame, as in the base 50. The adjustment screw 30 is then threaded into the nut formation and into engagement with guide elements 45. The constant torque engagement of the nut formation with the screw shank 30 assures that the screw will hold its adjustment. The guide elements 45 maintain the screw shank against rocking about its substantially true engagement with the nut formation, to provide lateral stability and thereby render the torque-resistant engagement effective.

Figure 7:
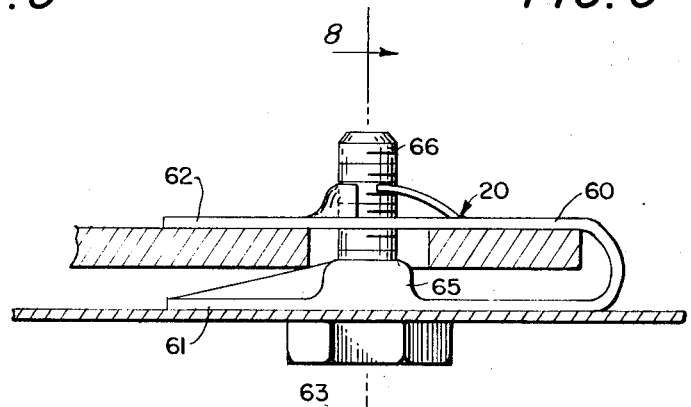
FIG. 7 is a cross-sectional view of the mounting of another type of fastener embodying the novel nut formation, with the fastener shown in elevation.
Figure 8:
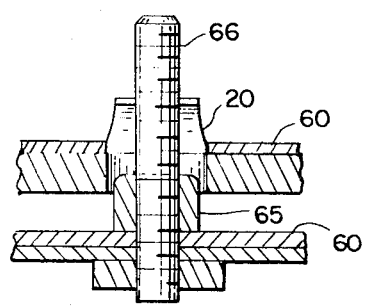
FIG. 8 is a cross-sectional view of the line 8—8 of FIG. 7.

In FIGS. 7 and 8, a U-shaped clip 60 is formed with parallel arms 61, 62 having aligned apertures 63, 64. Aperture 63 in arm 61 is surrounded by an upstanding boss 65, which extends toward arm 62 and forms an abutment limiting movement of the arms, and also guides the threaded shank 66. The other arm 62 is provided with the constant torque nut formation 20, shown in FIG. 1.

The nut formation allows the arm 62 to be pulled up against the positive stop provided by boss 65, while the screw shank 66 is effectively held against loosening by the frictional engagement of the nut and screw shank. The boss 65 also acts as a guide to maintain the shank against tilting about the line engagement of the nut formation 20.

What is claimed is:

1. A sheet metal fastener for mounting in a flat sheet having a rectangular aperture, comprising a rectangular base portion with a nut formation having a plurality of peripheral edges lying substantially on a helical curve to engage the threads of a threaded shank, and including a resilient tongue struck out from the sheet metal with one of said peripheral edges formed on the end of said tongue to conform substantially to the threads of said shank, said peripheral edge being deflected axially out of the helical curve away from said base at one point between its ends to engage frictionally the side of a thread on said shank but with said helical edge and deflected portion confined between adjacent turns of said thread so that the frictional engagement of the thread and said peripheral edge with said deflected portion provides a constant resistance to rotation of said shank in said nut formation, and a pair of upstanding flanges on opposite sides of said base portion of greater length than said aperture to engage said mounting member and provided with a pair of upstanding arms extending through said aperture, each having resilient tongues inclined outwardly to pass through said aperture to engage the opposite side of said mounting member, and guide members on the ends of said arms spaced from said base portion and substantially aligned with said peripheral edges to guide a threaded shank extending between said peripheral edges.

* * * * *